(12) United States Patent
Arsenault et al.

(10) Patent No.: US 11,317,174 B2
(45) Date of Patent: Apr. 26, 2022

(54) METHOD AND SYSTEM FOR MODIFYING ROUTING INFORMATION ASSOCIATED TO A PARTY

(75) Inventors: Jonathan Allan Arsenault, Orleans (CA); Eric John Wolf, Stittsville (CA); Denis Mercier, Bolschatel (CA)

(73) Assignee: BCE INC., Verdun (CA)

( * ) Notice: Subject to any disclaimer, the term of this patent is extended or adjusted under 35 U.S.C. 154(b) by 1550 days.

(21) Appl. No.: 12/745,352

(22) PCT Filed: Dec. 27, 2007

(86) PCT No.: PCT/CA2007/002364
§ 371 (c)(1),
(2), (4) Date: May 28, 2010

(87) PCT Pub. No.: WO2009/082804
PCT Pub. Date: Jul. 9, 2009

(65) Prior Publication Data
US 2010/0312912 A1  Dec. 9, 2010

(51) Int. Cl.
*H04Q 3/66* (2006.01)
*H04M 3/42* (2006.01)
(Continued)

(52) U.S. Cl.
CPC ........... *H04Q 3/66* (2013.01); *H04M 3/02* (2013.01); *H04M 3/4217* (2013.01);
(Continued)

(58) Field of Classification Search
CPC ...................................................... H04Q 3/66
See application file for complete search history.

(56) References Cited

U.S. PATENT DOCUMENTS

| 5,220,599 A | 6/1993 | Sasano et al. |
| 5,276,731 A | 1/1994 | Arbel et al. |

(Continued)

FOREIGN PATENT DOCUMENTS

| CA | 2533514 | 2/2005 |
| EP | 0569164 | 10/1993 |

(Continued)

OTHER PUBLICATIONS

Supplementary European Search Report completed on Nov. 26, 2010 in connection with European Patent Application 07 855 626, 4 pages.

(Continued)

*Primary Examiner* — Suraj M Joshi

(57) ABSTRACT

A method and system implemented by a network entity. The method comprising accessing communication routing information associated to a party. The communication routing information being indicative of at least a first termination device to which incoming communications for the party are to be routed. The method further comprises monitoring at least one of location information, presence information and behavior information associated to the party and processing the communication routing information and the at least one of the location information, presence information and behavior information at least in part on the basis of modification information in an attempt to determine the suitability of modifying the communication routing information. When it is determined that the communication routing information is suitable for modification, causing the party to be advised.

43 Claims, 4 Drawing Sheets

(51) Int. Cl.
*H04M 3/02* (2006.01)
*H04M 3/54* (2006.01)
H04M 3/436 (2006.01)
H04M 3/44 (2006.01)

(52) U.S. Cl.
CPC ... *H04M 3/42263* (2013.01); *H04M 3/42348* (2013.01); *H04M 3/54* (2013.01); *H04M 3/42059* (2013.01); *H04M 3/436* (2013.01); *H04M 3/44* (2013.01); *H04M 2201/10* (2013.01)

(56) References Cited

U.S. PATENT DOCUMENTS

| | | | |
|---|---|---|---|
| 5,299,260 A | 3/1994 | Shaio | |
| 5,329,578 A | 7/1994 | Brennan et al. | |
| 5,392,342 A | 2/1995 | Rosenthal | |
| 5,430,791 A | 7/1995 | Feit et al. | |
| 5,465,295 A | 11/1995 | Furman | |
| 5,479,496 A | 12/1995 | Endo et al. | |
| 5,506,890 A | 4/1996 | Gupta et al. | |
| 5,533,107 A | 7/1996 | Irwin et al. | |
| 5,596,631 A | 1/1997 | Chen | |
| 5,623,537 A | 4/1997 | Ensor et al. | |
| 5,764,746 A | 6/1998 | Reichelt | |
| 5,793,859 A | 8/1998 | Matthews | |
| 5,875,240 A | 2/1999 | Silverman | |
| 5,987,100 A | 11/1999 | Fortman et al. | |
| 5,999,613 A | 12/1999 | Nabkel et al. | |
| 6,005,870 A | 12/1999 | Leung et al. | |
| 6,067,349 A | 5/2000 | Suder et al. | |
| 6,134,310 A | 10/2000 | Swan et al. | |
| 6,295,353 B1 | 9/2001 | Flockhart et al. | |
| 6,304,573 B1 | 10/2001 | Hicks, III | |
| 6,389,117 B1 | 5/2002 | Gross et al. | |
| 6,400,808 B1 | 6/2002 | Burg | |
| 6,438,217 B1 | 8/2002 | Huna | |
| 6,529,592 B1 | 3/2003 | Khan | |
| 6,668,055 B2 | 12/2003 | Marwell et al. | |
| 6,721,397 B1 | 4/2004 | Lu | |
| 6,728,360 B1 | 4/2004 | Brennan | |
| 6,788,778 B2 | 9/2004 | Tatsumi | |
| 6,826,271 B1 | 11/2004 | Kanabar et al. | |
| 6,829,332 B2 | 12/2004 | Farris et al. | |
| 6,898,274 B1 | 5/2005 | Galt et al. | |
| 6,961,559 B1 | 11/2005 | Chow et al. | |
| 7,162,021 B1 | 1/2007 | Johnson et al. | |
| 7,269,412 B2 | 9/2007 | Bacon et al. | |
| 7,280,646 B2 | 10/2007 | Urban et al. | |
| 7,283,512 B2 | 10/2007 | Hall | |
| 7,295,656 B2 | 11/2007 | Ruckart | |
| 7,388,949 B2 | 6/2008 | Contractor et al. | |
| 7,474,432 B1 | 1/2009 | Kirchhoff et al. | |
| 7,609,832 B2 | 10/2009 | Kreiner et al. | |
| 7,672,444 B2 | 3/2010 | Perrella et al. | |
| 8,023,632 B2 | 9/2011 | Gruchala | |
| 8,031,851 B2 | 10/2011 | Holt et al. | |
| 8,175,904 B2 | 5/2012 | Templeteon | |
| 8,243,895 B2 | 8/2012 | Jain et al. | |
| 2002/0039407 A1 | 4/2002 | O'Donovan et al. | |
| 2002/0086662 A1 | 7/2002 | Culliss | |
| 2003/0003900 A1 | 1/2003 | Goss et al. | |
| 2003/0046421 A1* | 3/2003 | Horvitz | G06Q 10/107 709/238 |
| 2003/0058839 A1 | 3/2003 | D'Souza | |
| 2003/0060210 A1 | 3/2003 | Ravishankar et al. | |
| 2004/0028026 A1 | 2/2004 | McClung et al. | |
| 2004/0095925 A1 | 5/2004 | Cody et al. | |
| 2005/0053218 A1 | 3/2005 | Kim | |
| 2005/0054335 A1 | 3/2005 | Pearson et al. | |
| 2005/0064855 A1 | 3/2005 | Russell | |
| 2005/0100155 A1 | 5/2005 | Trinkel et al. | |
| 2005/0207361 A1 | 9/2005 | Rosenberg et al. | |
| 2005/0245236 A1 | 11/2005 | Servi et al. | |
| 2006/0029195 A1 | 2/2006 | Mullis et al. | |
| 2006/0177033 A1 | 8/2006 | Allen et al. | |
| 2006/0190591 A1 | 8/2006 | Bobde et al. | |
| 2007/0111743 A1 | 5/2007 | Leigh et al. | |
| 2007/0143397 A1 | 6/2007 | Guedalia et al. | |
| 2007/0147349 A1 | 6/2007 | Bangor et al. | |
| 2007/0153991 A1 | 7/2007 | Daigle | |
| 2007/0155370 A1 | 7/2007 | Daigle | |
| 2007/0263781 A1 | 11/2007 | Goldman et al. | |
| 2007/0299927 A1* | 12/2007 | Knauerhase | H04L 12/58 709/206 |
| 2009/0055502 A1* | 2/2009 | Agarwal | G06Q 10/107 709/207 |
| 2009/0086720 A1 | 4/2009 | Westlake | |
| 2009/0111474 A1* | 4/2009 | Hill | H04W 92/06 455/445 |
| 2009/0131080 A1* | 5/2009 | Nadler | G06Q 30/02 455/456.3 |
| 2009/0247188 A1* | 10/2009 | Ridley | H04W 4/02 455/456.2 |
| 2012/0106725 A1 | 5/2012 | Smith et al. | |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 | 1/2006 |
| JP | 2002016701 | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | WO2008042990 | 4/2008 |
| WO | 2008067631 | 6/2008 |
| WO | 2008077226 | 7/2008 |

OTHER PUBLICATIONS

Nunn, A., "Voice Evolution", BT Technology Journal, Kluwer Academic Publishers, DO, vol. 23, No. 1, Jan. 1, 2005 (Jan. 1, 2005), pp. 120-133, XP019218795, ISSN: 1573-1995, DOI: DOI: 10.1007/S10550-005-0113-3.
Supplementary European Search Report completed on Sep. 30, 2011 in connection with European Patent 07 855 645, 7 pages.
One Voice Technologies, "Send E-mail. Voice-to-Text Messaging Solution", www.onev.com/solutions/mobile_send.asp, 2 pages.
International Search Report dated Aug. 21, 2008 in connection with International patent application PCT/CA2007/002323, 3 pages.
International Search Report dated Sep. 9, 2008 in connection with International patent application PCT/CA2007/002347, 6 pages.
Written Opinion of the International Searching Authority dated Sep. 9, 2008 in connection with International patent application PCT/CA2007/002347, 10 pages.
International Search Report dated Sep. 9, 2008 in connection with International patent application PCT/CA2007/002279, 3 pages.
International Search Report dated Sep. 29, 2008 in connection with International patent application PCT/CA2007/002363, 4 pages.
International Search Report dated Sep. 17, 2008 in connection with International patent application PCT/CA2007/002346, 3 pages.
Tyson J. et al., "How VoIP Works", 2005, http://www.engedi.net/documents/HowVoIPWorks_Feb.pdf, Sep. 2008, 7 pages.
Written Opinion of the International Searching Authority dated Sep. 17, 2008 in connection with International patent application PCT/CA2007/002346, 6 pages.
International Search Report dated Sep. 19, 2008 in connection with International patent application PCT/CA2007/002364, 3 pages.
Written Opinion of the International Searching Authority dated Sep. 19, 2008 in connection with International patent application PCT/CA2007/002364, 4 pages.
"Google Voice", http://www.google.com/googlevoice/about.html, 1 page.

(56) References Cited

OTHER PUBLICATIONS

Written Opinion of the International Searching Authority dated Aug. 21, 2008 in connection with International patent application PCT/CA2007/002323, 5 pages.
Written Opinion of the International Searching Authority dated Sep. 9, 2008 in connection with International patent application PCT/CA2007/002279, 5 pages.
Written Opinion of the International Searching Authority dated Sep. 29, 2008 in connection with International patent application PCT/CA2007/002363, 6 pages.
Written Opinion of the International Searching Authority dated Sep. 24, 2008 in connection with International patent application PCT/CA2007/002365, 5 pages.
International Search Report dated Sep. 24, 2008 in connection with International Patent Application PCT/CA2007/002365, 4 pages.
International Preliminary Report on Patentability completed on Apr. 15, 2010 in connection with International Patent Application PCT/CA2007/002362, 5 pages.
Extended European Search Report completed on Nov. 26, 2010 in connection with European Patent Application 07 85 5626, 4 pages.
Office Action dated Mar. 15, 2012 in connection with U.S. Appl. No. 12/809,806, 9 pages.
Examiner's Report dated Jun. 4, 2012 in connection with Canadian Patent Application 2,647,920, 2 pages.
Office Action dated May 25, 2012 in connection with U.S. Appl. No. 12/673,233, 9 pages.
Supplementary European Search Report dated May 22, 2012, in connection with European Patent Application 07855561, 6 pages.
Office Action dated Aug. 31, 2012 in connection with U.S. Appl. No. 12/809,711, 30 pages.
Office Action dated Sep. 10, 2012 in connection with U.S. Appl. No. 12/809,806, 15 pages.
Office Action dated Oct. 5, 2012 in connection with U.S. Appl. No. 12/643,010, 9 pages.
Office Action dated Oct. 15, 2012 in connection with U.S. Appl. No. 12/673,233, 12 pages.
Office Action dated Feb. 8, 2013 in connection with U.S. Appl. No. 12/809,711, 41 pages.
Office Action dated Jan. 4, 2013 in connection with U.S. Appl. No. 12/809,407, 31 pages.
Examiner's Report dated Aug. 12, 2013 in connection with Canadian Patent Application 2,710,245, 7 pages.
Office Action dated Jun. 6, 2013 in connection with U.S. Appl. No. 12/674,262, 10 pages.
Office Action dated Jun. 18, 2013 in connection with U.S. Appl. No. 12/743,325, 9 pages.
Office Action dated Aug. 23, 2013 in connection with U.S. Appl. No. 12/809,711—45 pages.
Office Action dated Aug. 15, 2013 in connection with U.S. Appl. No. 12/673,233—11 pages.
Notice of Allowance dated Nov. 20, 2013 in connection with U.S. Appl. No. 12/674,262, 13 pages.
Notice of Allowance dated Nov. 5, 2013 in connection with U.S. Appl. No. 12/809,711, 13 pages.

* cited by examiner

METHOD AND SYSTEM FOR MODIFYING ROUTING INFORMATION ASSOCIATED TO A PARTY

FIELD OF THE INVENTION

The present invention relates generally to a method of routing communications destined for a given party, and more particularly, to a method and system for modifying the way communications are routed to the given party.

BACKGROUND

Most telephony service providers offer a variety of telephony features to their customers. These telephony features help telephony users to manage the way their incoming and outgoing communications are handled. Some non-limiting examples of such telephony features include call waiting, call forwarding, "find me/follow me" (FM/FM) call forwarding, distinctive ringing, selective call rejection, selective call acceptance, outgoing call blocking (or barring), etc.

Each of these call features allows a user to tailor the way their incoming and outgoing calls, or other forms of communication (such as SMS messages, emails, etc . . . ) are handled. One of the more popular features used by telephony users is the user configurable call routing. Call routing can be done via telephony features such as call forwarding, selective call forwarding or "find me/follow me" (FM/FM) call forwarding, among other possibilities. Such features allow a user to define when they can be reached, where the can be reached and how they can be reached. For example, a user having the "find me/follow me" feature can define their personal routing information as follows: When anybody calls my office number, I want my office number to ring 3 times, then if I don't answer, I want my cell phone to ring 3 times. If I don't answer my cell phone, then route the call to my voicemail. The options for routing an incoming call are virtually unlimited.

In general, in order to configure the call routing rules, a user is usually required to interact with a representative, an interactive voice response (IVR) unit, or a data network site (e.g., a web site) associated with a provider of this feature. As such, one of the deficiencies with call routing rules, such as "find me/follow me" rules, is that configuring these rules is a user-initiated task. In other words, in order to configure the routing rules, a user must login to a configuration (or provisioning) system in order to change previously established rules. In some situations, this process can be inconvenient, impractical and/or inefficient. In addition, the fact that it is user initiated can result in a user forgetting to change the routing rules they have previously established, which can lead to unwanted consequences in the form of important calls being missed.

Take for example the case of Alice, a telephony user who subscribes to the "find me/follow me" feature. On Monday, Alice decides to work from her home office, and as such, configures her call routing rules such that all calls to her work office are forwarded to her home office phone number. Then, on Tuesday, Alice returns to her work office, but forgets that all her calls are still being forwarded to her home office. It is possible that Alice doesn't realize that her calls are being forwarded to her home office until later in the day, after which time many important calls may have been missed. Situations like this can result in user dissatisfaction with the telephony service.

In these and other situations, it is apparent that existing ways of configuring telephony features are inconvenient, impractical and/or inefficient.

SUMMARY OF THE INVENTION

In accordance with a first broad aspect, the invention provides a method implemented by a network entity. The method comprises accessing communication routing information associated to a party. The communication routing information being indicative of at least one termination device to which incoming communications for the party are to be routed. The method further comprises monitoring behavior information associated to the party and processing the communication routing information and the behavior information at least in part on the basis of modification information in an attempt to determine if the communication routing information is suitable for modification. When it is determined that the communication routing information is suitable for modification the method further comprises causing the party to be advised.

In accordance with a second broad aspect, the invention provides a network entity comprising an interface and a processing entity. The interface is operative for accessing communication routing information associated to a party, the communication routing information being indicative of at least one termination device to which incoming communications for the party are to be routed, and monitoring behavior information associated to the party. The processing entity is operative for processing the communication routing information and the behavior information at least in part on the basis of modification information in an attempt to determine if the communication routing information is suitable for modification, and for causing the party to be advised when it is determined that the communication routing information is suitable for modification.

In accordance with a third broad aspect, the invention provides a computer-readable storage medium comprising a program element for execution by a processing unit. The program element comprises a first program code for accessing communication routing information associated to a party. The communication routing information being indicative of at least one termination device to which incoming communications for the party are to be routed. The program element further comprises a second program code for monitoring behavior information associated to the party, and a third program code for processing the communication routing information and the behavior information at least in part on the basis of modification information in an attempt to determine if the communication routing information is suitable for modification. The program element further comprises a fourth program code for causing the party to be advised when said processing has determined that the communication routing information is suitable for modification.

In accordance with a fourth broad aspect, the invention provides a method implemented by a network entity. The method comprises accessing communication routing information associated to a party. The communication routing information being indicative of at least one termination device to which incoming communications for the party are to be routed. The method further comprises monitoring location information associated to the party and processing the communication routing information and the location information at least in part on the basis of modification information in an attempt to determine if the communication routing information is suitable for modification. When it is determined that the communication routing information is suitable for modification the method further comprises causing the party to be advised.

In accordance with a fifth broad aspect, the invention provides a network entity comprising an interface and a processing entity. The interface is operative for accessing communication routing information associated to a party, the communication routing information being indicative of at least one termination device to which incoming communications for the party are to be routed, and monitoring location information associated to the party. The processing entity is operative for processing the communication routing information and the location information at least in part on the basis of modification information in an attempt to determine if the communication routing information is suitable for modification, and for causing the party to be advised when it is determined that the communication routing information is suitable for modification.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
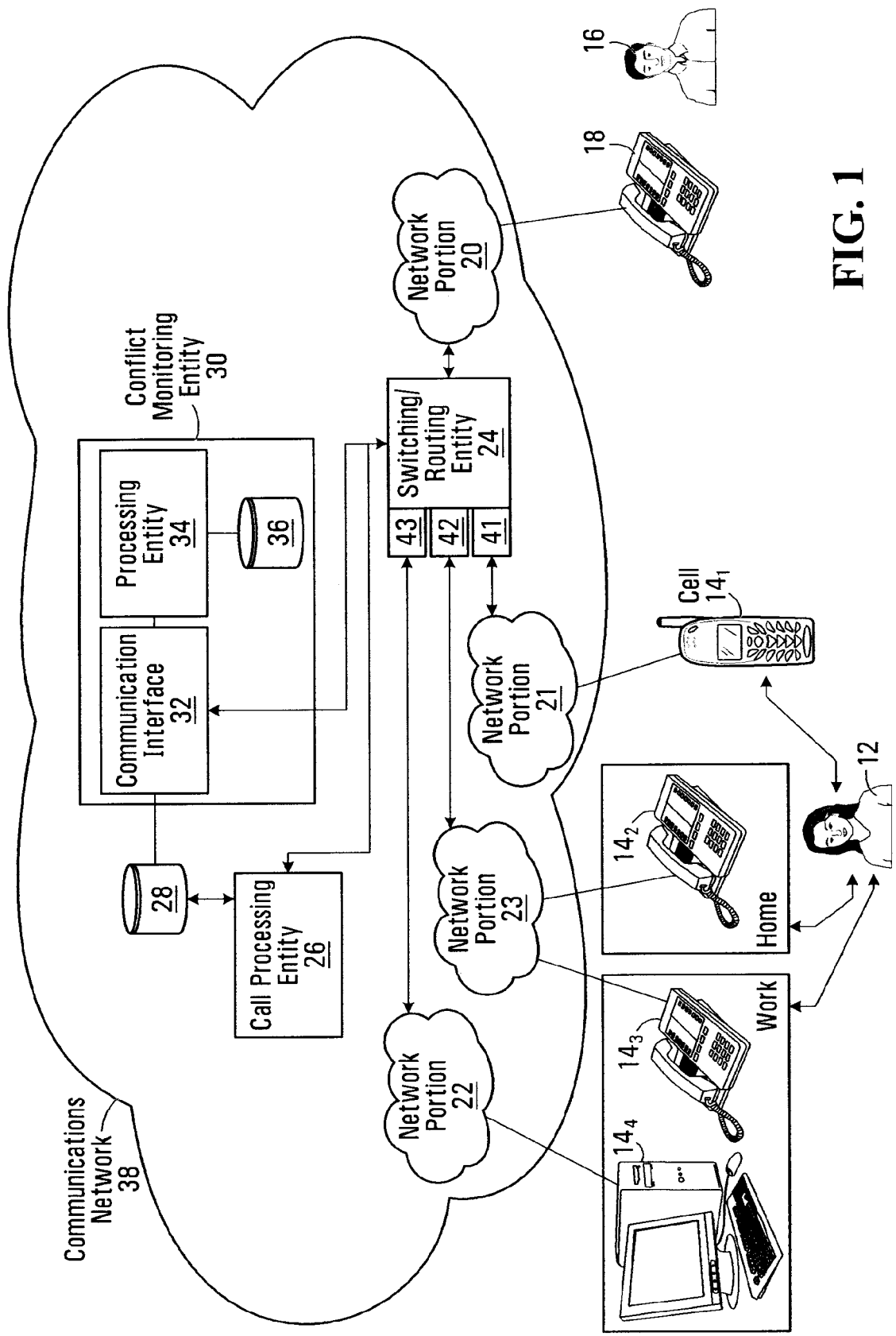
FIG. 1 illustrates a system comprising a conflict monitoring entity that enables modification of routing information associated to a party, in accordance with a non-limiting embodiment of the present invention.

Shown in FIG. 1 is a non-limiting example of an architecture for a communications network 38 that is suitable for enabling communication between communication devices associated to different customers, such as customers 12 and 16, for example. Although only two customers 12 and 16 are shown in FIG. 1, it should be appreciated that the communications network 38 is suitable for enabling communication between hundreds of thousands of customers, if not more, via their associated communication devices.

In today's society, many telephony users have multiple communication devices that they use on a regular basis in order to originate and receive communications such as phone calls, emails, instant messages or text messages, among other possibilities. For example, it is not unusual for a given telephony user to have a cellular phone (or smart phone), a home phone and a work-place phone each having a separate phone number. In the example shown in FIG. 1, customer 12 is associated with four different communication devices $14_1$, $14_2$, $14_3$ and $14_4$ that can each be employed by customer 12 to effect telephonic communications, including handling incoming calls, originating outgoing calls, and participating in calls in progress. Although customer 12 is associated with four different communication devices $14_1$, $14_2$, $14_3$ and $14_4$, it should be appreciated that in various other embodiments, customer 12 could be associated with any number of communication devices 14.

In the specific embodiment shown in FIG. 1, the communication devices $14_1$, $14_2$, $14_3$ and $14_4$ associated with customer 12 include a cellular phone (communication device $14_1$) a POTS home phone (communication device $14_2$) a POTS work phone (communication device $14_3$) and a Voice-over Internet Protocol (VoIP) phone (communication device $14_4$) that is implemented through customer 12's work-place computer. It should be appreciated, however, that each of the communication devices $14_1$, $14_2$, $14_3$, $14_4$ could be any type of communication device suitable for originating, receiving and participating in communications with other communication devices through the communications network 38. For example, each one of the communication devices $14_1$, $14_2$, $14_3$, $14_4$ could be any of a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television (TV) unit (e.g., a set-top box connected to a television and a remote control). Depending on the functionality of each communication device $14_1$, $14_2$, $14_3$, $14_4$, a call originated by, destined for, or in progress at the communication device $14_1$, $14_2$, $14_3$, $14_4$ may be a voice communication session, a video communication session, a multimedia communication session, or any other type of communication session.

For the purposes of simplicity, customer 16 is associated with only one communication device 18 that is a wired Plain Old Telephony System (POTS) phone. It should, however, be appreciated that customer 16 could also be associated to any number of communication devices, including any of the types of communication devices listed above.

Referring back to customer 12, each of the communication devices $14_1$, $14_2$, $14_3$ and $14_4$ associated to customer 12 is connected to a switching/routing entity 24 via various network portions 21, 22 and 23 of the communications network 38. Communication device 18 is also connected to the switching/routing entity 24 through a network portion 20 of the communications network 38. As will be described in more detail below, the communications network 38 may comprise a portion of one or more of the Public Switched Telephone Network (PSTN), a wireless network (e.g., a cellular network), and a data network (e.g., the Internet). The switching/routing entity 24 enables the communication devices $14_1$, $14_2$, $14_3$, $14_4$ and 18 to reach or be reached by any of various other communication devices (which are not shown for the sake of simplicity).

The nature of the network portions 20, 21, 22 and 23 and the switching/routing entity 24 will depend on the nature of the communication devices $14_1$, $14_2$, $14_3$, $14_4$, 18 being used, and where the switching/routing entity 24 resides in the communications network 38. This will be further described with respect to the communication devices $14_1$, $14_2$, $14_3$, $14_4$, associated with customer 12.

For example, where the communication device $14_1$ is a wireless phone, the switching/routing entity 24 may reside in a wireless network. In addition, the network portion 21 may comprise a wireless link in combination with a base station and a network-side wireline link, and the switching/routing entity 24 may be part of a mobile switching center. Where the communication devices $14_2$ and $14_3$ are wired POTS phones, the switching/routing entity 24 may reside in the PSTN. In addition, the network portion 23 may comprise a telephone line in the PSTN and the switching/routing entity 24 may be part of a central office switch. In yet another example, where the communication device $14_4$ is a VoIP phone (or a POTS phone equipped with an ATA) the switching/routing entity 24 may reside in a data network. In such a case, network portion 22 may comprise a digital communications link (e.g., Ethernet) and the switching/routing entity 24 may be part of a router (e.g., an edge router or a core router) or a softswitch. In accordance with a specific non-limiting example, the switching/routing entity 24 can be the MCS 5200 Soft Switch manufactured by Nortel Networks Limited of 8200 Dixie Road, Brampton, Ontario L6T 5P6, Canada, although it should be appreciated that this is but one non-limiting example among many possibilities within the scope of the present invention. In yet another example of implementation, where a communication device (not shown) is a soft phone, its associated network portion may comprise a digital communications link (e.g., a digital subscriber line (DSL) link or a coaxial cable) and the switching/routing entity 24 may be part of a server equipped with a modem. It will be appreciated that various other implementations of network portions and the switching/routing entity 24 are possible (e.g., such as where the communication device is a telephony-enabled TV unit).

It will also be appreciated that, as shown in FIG. 1, the switching/routing entity 24 may span across different networks (i.e., PSTN, wireless, and/or data) in which case the switching/routing entity 24 may comprise one or more gateways 41, 42 and 43 for enabling communication and interoperability between these networks. Alternatively, the switching/routing entity 24 may not include the gateways 41, 42 and 43. Instead, the gateways could be part of a separate server that is not shown. Such gateways are well known to those skilled in the art and need not be described in further detail.

The switching/routing entity 24 is operative to effect switching/routing operations to help route communications originating from one of the communication devices $14_1$, $14_2$, $14_3$ and $14_4$ and destined for a called party device (such as the communication entity 18). In addition, the switching/routing entity 24 is operative to effect switching/routing operations to help route communications originated at a calling party device (such as the communication entity 18) and destined for one of the communication devices $14_1$, $14_2$, $14_3$ and $14_4$. Furthermore, the switching/routing entity 24 is communicatively coupled to a call processing entity 26, which is described later on, and interacts therewith. The switching/routing entity 24 comprises suitable hardware, firmware, software, control logic, or a combination thereof for implementing its functionality.

Figure 2:
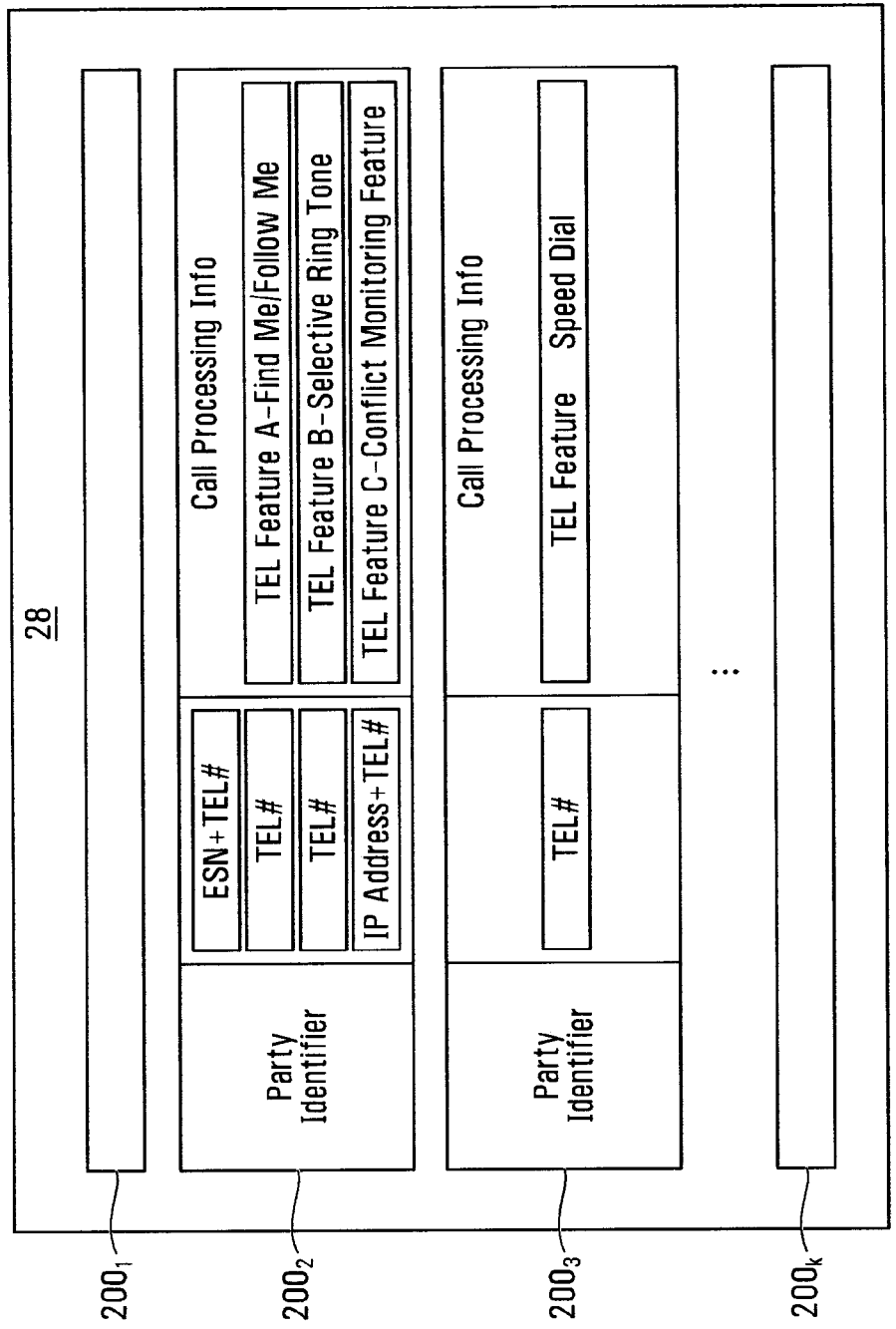
FIG. 2 illustrates an example of potential contents of a database of the system shown in FIG. 1.

The call processing entity 26 is communicatively coupled to a database 28, and is operative to interact with the switching/routing entity 24 and the database 28 in order to effect various call processing operations when a communication device (such as the communication devices $14_1$, $14_2$, $14_3$ and $14_4$) receives an incoming call, originates an outgoing call, or participates in a call in progress. K k FIG. 2 shows a non-limiting example of the potential contents of the database 28. In this example, the database 28 stores a plurality of records $200_1$-$200_k$ each associated with a respective customer (such as customer 12) which may be a potential calling party as well as a potential called party. Each record $200_1$-$200_k$ stores an association between a respective customer and the communication devices that are associated to that customer. For example, the customer can be identified by a party identifier, which may be based on the customer's name or billing address, among other possibilities. The communication devices associated to the customer could be identified by a telephone number identifying a telephone line associated with a POTS communication device, an electronic serial number (ESN) and telephone number associated with a wireless communication device, and an IP address and telephone number (and/or another Uniform Resource Identifier (URI) such as a Session Initiation Protocol (SIP URI) used by a VoIP phone, an ATA-equipped POTS phone, or a softphone. In addition, each record $200_1$-$200_k$ stores an indication of call processing information associated with each customer. This call processing information indicates how calls involving the customer, i.e., calls originated by or destined for a communication device associated with the given customer, are to be processed by the call processing entity 26.

The call processing information associated with a given customer can take on many forms. In the embodiment shown, the call processing information associated with the customer is indicative of telephony features subscribed to by that customer. As will be described below, most telephony service providers provide a plurality of telephony services that will affect the way either an incoming communication, or an outgoing communication, is handled. As such, the call processing information that is stored in the database 28 is used by the call processing entity 26 during the processing of calls in order to apply any telephony feature subscribed to by the respective customer. Subscription to different telephony features may be completely independent from one customer to another and there is no restriction on a number or combination of features that may be subscribed to by any one customer. In some cases, a customer may not subscribe to any telephony feature, while in other cases a customer may subscribe to all available telephony features.

Some non-limiting examples of available telephony features include:
- a call forwarding feature, whereby every incoming call destined for a given communication device associated with a customer is to be forwarded to a second communication device associated with the customer;
- a selective call forwarding feature, whereby incoming calls that are originated by one or more communication entities associated with a selected given party, and destined for a first communication device associated with the customer is to be forwarded to a second communication device associated with the customer.
- a no-answer call forwarding feature, whereby an incoming call destined for a first communication device associated with the customer is to be forwarded to a second communication device associated with the customer if the incoming call is not answered on the first communication device within a predetermined period of time (e.g., ringing cycle);
- a "find me/follow me" (FM/FM) call forwarding feature, whereby an incoming call is to be forwarded to a plurality of communication devices respectively associated with the customer either simultaneously or sequentially (e.g., until the call is answered or until all the communication devices have been used and the call remains unanswered, in which case the call can be forwarded to a voicemail system);

a first distinctive ringing feature, whereby incoming calls destined for a communication device are to be announced by different audio signals (e.g., ring tones or songs) produced by the communication device when they originate from communication entities associated with different calling parties;

a selective call rejection feature, whereby an incoming call originated by any of one or more communication entities each associated with a given party and destined for a communication device associated with the customer is prevented from reaching the communication device associated with the customer;

a selective call acceptance feature, whereby only an incoming call originated by any of one or more communication entities each associated with a given party and destined for a communication device associated with the customer is allowed to reach the communication device associated with the customer;

a call waiting feature, whereby a communication device participating in a call in progress produces a notification for the user of the communication device of an incoming call destined for the communication device;

a calling line identification (CLID) displaying feature, whereby CLID information associated with a communication entity originating a call that is destined for a communication device associated with the customer is displayed by the communication device associated with the customer;

a CLID blocking feature, whereby CLID information (e.g., a telephone number and/or a name or other party identifier) associated with a communication device with which the customer originates an outgoing call destined for a communication entity belonging to another party is not provided to the communication entity belonging to the other party; and a speed calling feature, whereby an outgoing call destined for any of one or more communication devices that are associated with the same or different predetermined party can be originated by inputting into a communication device associated with the customer a specific code (e.g., a one or two digit code) that is shorter than the telephone number associated with the communication device for which the outgoing call is destined.

It is to be understood that these examples of telephony features are presented for illustrative purposes only and are not to be considered limiting in any respect as various other telephony features are or may become available.

A customer who subscribes to one or more of the telephony features listed above is generally able to configure the manner in which the telephony features work. This configuration is done by interacting with a representative, an interactive voice response (IVR) unit, or a data network site (e.g., a web site) associated with a provider of this feature. The following are some non-limiting examples of the manner in which a customer can configure each telephony feature:

for the aforementioned call forwarding feature, the customer may provide an indication as to which of their associated communication devices to forward incoming communications (for example, a customer could specify that whenever an incoming call is destined for his/her home phone, that the incoming call should be forwarded to his/her cell phone).

for the aforementioned selective call forwarding feature, the customer may provide an indication of the given calling party to whom the selective call forwarding feature is applicable, and to which communication device all incoming calls originating from that calling party should be forwarded to (for example, a customer could specify that whenever an incoming call was originated from a communication device associated with Bill, then that incoming call should be forwarded directly to the customer's work phone)

for the aforementioned no-answer call forwarding feature, the customer may specify the second communication device to which to forward incoming calls to, and the period of time before the incoming call should be forwarded to that second communication device (for example, a customer could specify that if an incoming call for their cellular phone is not answered within four rings, then that incoming call should be forwarded to the customer's work phone);

for the aforementioned FM/FM call forwarding feature, the customer could specify the order in which different communication devices associated to the customer are tried, when forwarding an incoming call. The customer could also specify the amount of time each communication device should be tried. (for example, a customer could specify that all incoming calls destined for their work phone should first be routed to their home phone and that if after 3 rings the incoming call is not answered, then at that time, the incoming call should be forwarded to the customer's cellular phone) The customer could also specify when all communication devices should be tried simultaneously (for example, the customer could specify that between 7 am and 9 am all calls destined for anyone of his/her communication devices should simultaneously be sent to all of his/her communication devices);

for the aforementioned first distinctive ringing feature, the customer may specify a specific audio tone associated to respective different parties (for example, the user may specify a first ring tone when a call is originating from the customer's mother, a second ring tone when a call is originating from the customer's girlfriend, and a third ring tone when a call is originating from the customer's boss)

for the aforementioned selective call rejection feature, the customer may specify one or more parties from whom incoming calls are to be rejected, as well as possible time periods during which the selective call rejection feature should be active (for example, the customer may specify that calls originating from communication devices associated with the customer's parents should be rejected between 9 am and 3 pm on weekdays)

for the aforementioned selective call acceptance feature, the customer may specify the one or more parties from whom incoming calls are to be accepted, as well as possibly time periods during which the selective call acceptance feature should be active (for example, the customer may specify that only calls originating from the customer's boss should be accepted on the customer's cell phone between 9 am and 5 pm)

for the aforementioned speed calling feature, the customer may specify the codes associated to different predetermined telephone numbers (for example, the customer may specify that code 11 is associated with the telephone number for the communication device belonging to the customer's mother)

It is to be understood that these are non-limiting examples of ways in which the customer can configure different telephony features, and are presented for illustrative purposes only and are not to be considered limiting in any respect.

In accordance with an embodiment of the present invention, the database 28 can also store information on whether a particular party subscribes to a "conflict monitoring feature". This "conflict monitoring feature" is offered in order to avoid potential conflicts between the way in which a telephony feature has been configured, and the way in which a user actually wants the telephony feature to function. These types of potential conflicts often occur when a user has configured one or more telephony features that provide communication routing information. As used herein, the term "communication routing information" relates to any information that instructs the call processing entity 26 how to route an incoming communication. For example, telephony features such as call forwarding, selective call forwarding, no-answer call forwarding and "find-me/follow-me", are all considered to provide communication routing information. In general, the communication routing information is indicative of at least one termination device associated to the called party to which incoming communications for that party are to be routed.

In certain circumstances, the communication routing information specifies more than one termination device to which incoming calls should be routed. For example, the communication routing information may be indicative that incoming calls are to be routed to two or more termination devices simultaneously (such as the user's work phone and the user's cell phone). Alternatively, the communication routing information may specify a sequence of termination devices to which incoming calls should be routed. For example, the communication routing information may be indicative that calls to the customer's work phone should first be routed to the customer's home phone, and then if there is no answer after 3 rings, to route the call to the customer's cell phone. Regardless of how the communication routing information is set up, it will identify at least one first termination device, which is the one or more termination device to which the calls are routed first.

In light of the fact that many of the above described telephony features are user configurable, it is possible that a user may configure his/her communication routing information in a way that is appropriate at a given time, but that may not be appropriate later on. For example, if on Monday customer 12 decides to work from her home office, as opposed to her work office, then customer 12 might configure her communication routing information such that all incoming communications destined for her work phone (i.e. communication device $14_3$) are to be forwarded to her home phone (i.e. communication device $14_2$). However, on Tuesday, when customer 12 returns to her work office, she may forget to reconfigure her communication routing information, thereby creating a potential conflict since important calls that would normally be arriving at her work phone are still being routed to her home phone. This could easily result in important calls being missed. Therefore, as will be described in more detail further on, the conflict monitoring feature determines when such a potential conflict exists, and causes a customer to be advised of the potential conflict. In this manner, a customer can be advised of a potential conflict so that they can re-configure or adjust his/her communication routing information, if need be, prior to any important calls (or emails, or text messages) being missed.

In the example shown in FIG. 2, only the customer associated with record $200_2$ subscribes to the conflict monitoring feature contemplated herein, while the customers associated with the records $200_{3-k}$ do not. It is to be understood that, in other embodiments, all customers may benefit from the conflict monitoring feature contemplated herein without needing to subscribe thereto, in which case the database 28 may not include information on whether a particular customer subscribes to the conflict monitoring feature.

For the sake of example, record $200_2$ is associated with customer 12 shown in FIG. 1, and record $200_3$ is associated with customer 16. Record $200_2$ includes an indication of the party identifier associated with customer 12 (which could be customer 12's name) and an indication of the communication devices $14_1$, $14_2$, $14_3$ and $14_4$. associated with customer 12. As shown, record $200_2$ includes an indication of the ESN and telephone number associated with cellular phone $14_1$, an indication of the telephone number associated with the home POTS phone $14_2$, an indication of the telephone number associated with the work POTS phone $14_3$ and an indication of the IP address and telephone number associated with the work VOIP phone $14_4$. In addition, record $200_2$ includes an indication of the call processing information associated with customer 12. As shown, customer 12 subscribes to three telephony features; namely the "find me/follow me" feature, the selective ring tone feature and the conflict monitoring feature that will be explained in more detail herein.

As mentioned above, record $200_3$ is associated with customer 16, and as such includes an indication of the party identifier associated with customer 16. Record $200_3$ also includes an indication of the telephone number associated with the POTS phone 18 belonging to customer 16 and the telephony features subscribed to by customer 16. In the example shown, customer 16 only subscribes to one telephony feature, namely the speed dial feature.

With renewed reference to FIG. 1, and as mentioned above, the call processing entity 26 is operative to interact with the switching/routing entity 24 and the database 28 in order to effect various call processing operations when a communication device (such as the communication devices $14_1$, $14_2$, $14_3$ and $14_4$) connected to the switching/routing entity 24 receives an incoming call, originates an outgoing call, or participates in a call in progress. More particularly, the call processing entity 26 is operative to process calls arriving at the switching/routing entity 24. The processing of a given call by the call processing entity 26 can be viewed as the call processing entity 26 performing one or more operations to process the given call. In this embodiment, the call processing entity 26 is operative to process calls in accordance with a set of rules. Each rule may be defined by a condition, an operation to be performed if the condition is satisfied for a given call, and an operation to be performed if the condition is not satisfied for a given call (e.g., <condition><operation to be performed if condition is satisfied><operation to be performed if condition is not satisfied>). For a given rule, the condition may be defined in terms of one or more characteristics of a call. Examples of characteristics of a call are: its origin, which may be expressed, for instance, as a telephone number or other identifier (e.g., an IP address or SIP URI) associated with a communication device that originated the call; its intended destination, which may be expressed, for instance, as a telephone number or other identifier (e.g., an IP address or SIP URI) associated with a communication device for which the call is destined; and a time at which it was originated (e.g., a date, hour, minute, etc.). For a given rule, the condition may also be defined in terms of call processing information (in this case, telephony feature information) that is included in the records $200_1$-$200_k$ of the database 28. For a given rule, the operations to be performed based on whether the condition is satisfied depends on the nature of the given rule (e.g., route a call to its intended destination, forward a call in accordance with a call forwarding feature, cause production of an audio signal in accordance with a distinctive ringing feature, prevent establishment of an outgoing call in accordance with an outgoing call barring feature, etc.). The call processing entity 26 comprises suitable hardware, firmware, software, control logic, or a combination thereof for implementing its functionality.

Continuing with FIG. 1, in accordance with an embodiment of the present invention, a conflict monitoring entity 30 for implementing the conflict monitoring feature contemplated herein is communicatively coupled to the switching/routing entity 24, the call processing entity 26, and the database 28. It should be appreciated that the conflict monitoring entity 30 and the call processing entity 26 could have been shown as the same box in FIG. 1. In such a case, the functionality of the conflict monitoring entity 30 would be included as part of the functionality of the call processing entity 26.

As will be further detailed later on, the conflict monitoring entity 30 is operative for accessing the communication routing information associated to a given subscriber of the conflict monitoring feature, and for monitoring behavior information associated to that subscriber. This information is processed at least in part on the basis of modification information stored in memory unit 36 (which will be described in more detail further on) in an attempt to determine the suitability of modifying the communication routing information. Upon determination that the communication routing information associated to the given party is suitable for modification, the conflict monitoring entity 30 then causes the given party to be advised of this determination. In this manner, the conflict monitoring entity 30 provides a sort of "safety feature" for detecting when the communication routing information should be modified, and for advising the user of this determination. The conflict monitoring feature can help a customer avoid the situation where their communication routing information is configured in a way such that it is not functioning in a way that the customer might expect. In other embodiments, when the conflict monitoring entity 30 has determined that the communication routing information is suitable for modification, it is also able to provide a suggestion to the customer as to how to modify their communication routing information, if desired. This provides added convenience for the customer. In accordance with a non-limiting embodiment, the customer may be provided with a link to an interface for enabling them to modify or update their communication routing information.

The conflict monitoring entity 30 comprises suitable hardware, firmware, software, control logic, or a combination thereof for implementing a plurality of functional units, including a communication interface 32, a processing entity 34 and a memory unit 36, whose functionality will be described in further detail below.

In some embodiments, one or more of the switching/routing entity 24, the call processing entity 26, the database 28, and the conflict monitoring entity 30 may reside in a common network element of the communications network 38. In such embodiments, links between these components may be physical (i.e., wired or wireless) links or logical links. In other embodiments, different ones of the switching/routing entity 24, the call processing entity 26, the database 28, and the conflict monitoring entity 30 may reside in different network elements of the communications network 38 that are interconnected via one or more physical links and possibly other elements (e.g., gateways) of the communications network 38. Also, although it is depicted in FIGS. 1 and 2 as being one component, the database 28 may be distributed in nature, i.e., it can have portions of its content stored in different memory units possibly located in different network elements of the communications network 38. For example, the call processing information shown in FIG. 2 may be stored in a memory unit dedicated to storing this information and distinct from a memory unit that stores other contents of the database 28 shown in FIG. 2.

The interaction between the switching/routing entity 24, the call processing entity 26, the database 28, and, in particular, the conflict monitoring entity 30 for implementing the "conflict monitoring feature" will now be described in more detail, by way of example, with reference to customer 12 and the flow chart shown in FIG. 3.

Step 300

Firstly, at step 300, the conflict monitoring entity 30 accesses customer 12's call processing information stored in database 28, in order to obtain customer 12's communication routing information. The communication routing information associated to customer 12 can be accessed in a variety of ways. For example, conflict monitoring entity 30 can periodically poll database 28 in order to determine if there is a change in customer 12's communication routing information. Alternatively, whenever call processing entity 26 detects that customer 12 has re-configured her communication routing information (by interacting with a representative, an IVR or a website associated with the service provider), the call processing entity 26 can cause the modified communication routing information to be forwarded to the conflict monitoring entity 30. In yet a further alternative, each time the processing entity 26 receives a request to originate or terminate a call for customer 12 it may trigger conflict monitoring entity 30 to poll database 28.

For the sake of example, let us assume that customer 12 has decided to work from home today, and has configured her "find-me/follow-me" telephony feature such that any incoming calls destined for her work phone (i.e. communication device $14_3$) should be forwarded firstly to her home phone (i.e. communication device $14_2$) and then if there is no answer after 3 rings, to her cellular phone (i.e. communication device $14_1$). As such, by accessing record $200_2$ contained in database 28 (via communication interface 32) the conflict monitoring entity 30 becomes aware that customer 12's communication routing information specifies that when an incoming call is destined for her work phone (i.e. communication device $14_3$), then the first termination device to which calls for that phone are to be routed, is to her home phone (i.e. communication device $14_2$).

Step 302

At step 302, the conflict monitoring entity 30 monitors the behavior information associated to customer 12. It should be appreciated that although step 302 is shown in FIG. 2 as being performed after step 300, steps 300 and 302 can be performed substantially simultaneously without departing from the spirit of the invention.

In order to monitor the behavior information associated with customer 12, the conflict monitoring entity 30 interacts with the switching/routing entity 24 as well as the network portions 21, 22 and 23. The nature of the behavior information, as well as the manner in which this information is monitored is described in more detail below.

The behavior information that is monitored by the conflict monitoring entity 30 can be indicative of certain activities that have been performed, or that are to be performed, by a user. In addition, the behavior information can be indicative of the "presence" information associated with a user.

For example, the presence information that is monitored by the conflict monitoring entity 30 is generally indicative of a customer's ability to engage in communication exchanges on a given communication device over the communications network 38. For example, customer 12's work computer (i.e. communication device 14$_4$) which is a computer terminal that is connected to a network, is able to provide presence information via a network connection to a presence service, such that the presence information can be made available for distribution to others. When customer 12 is logged into the communication network 38 via her work place computer (i.e. communication device 14$_4$) presence information is provided to other user's of the network, which conveys customer 12's availability for communication, such as via instant messaging or voice communication, such as Voice over IP, for example. As such, in the case where customer 12 logs onto her work place computer (i.e. communication device 14$_4$) the network portion 22 and switching routing entity 24 are able to convey to the communication interface 32 that the user is present at communication entity 14$_4$. In this manner, the conflict monitoring entity 30 that is monitoring customer 12's behavior information becomes aware of customer 12's presence information.

As mentioned above, the behavior information that is monitored by the conflict monitoring entity 30 can also be indicative of certain activities that have been performed, or that are to be performed, by a user. For example, the behavior information may be indicative of a communication device that is being used by the customer to make an outgoing call, a communication device that has been turned off or a scheduled event contained in the customer's electronic organizer.

In the case where the behavior information is indicative that customer 12 is using one of her associated communication devices 14$_1$, 14$_2$, 14$_3$, 14$_4$ to make an outgoing call, the network portion and switching/routing entity 24 associated with that communication device are able to detect that the device is making an outgoing call, and informing the conflict monitoring entity 30 as to which communication device 14$_1$, 14$_2$, 14$_3$, 14$_4$ is making the outgoing call. For example, in the case where a customer originates a call at her work phone (communication device 14$_3$), the network portion 23 will detect use of the work phone and will indicate to the switching routing entity 24 that phone 14$_3$ is being used. This information will be passed from the switching/routing entity 24 to the call processing entity 26 and the conflict monitoring entity 30, such that the conflict monitoring entity 30 is aware that customer 12's work phone has been used.

In the case where the behavior information is indicative that one or more of the customer's communication devices 14$_1$, 14$_2$, 14$_3$, 14$_4$ is turned off, the network portion associated with that communication device and the switching routing entity 24 advise the conflict monitoring entity 30 that the given communication device has been turned off.

In the case where the behavior information is indicative of a scheduled event contained in an electronic organizer associated to customer 12 (such as microsoft outlook), the conflict monitoring entity 30 may monitor the information stored in the electronic organizer in order to determine scheduled events. By monitoring the scheduled events associated to customer 12, the conflict monitoring entity 30 can determine when the customer has meetings, out of office days and/or telephone conferences, which could indicate that one or more communication devices associated to customer 12 should not be disturbed during those times. Typically a customer's electronic organizer will operate on one of the customer's computing devices. As such, in the case of customer 12, the electronic organizer is executed on customer 12's work place computer (i.e. communication device 14$_4$). As such, the information contained in the customer's electronic organizer is provided to the conflict monitoring entity 30 by the computer via network portion 22 and the switching routing entity 24.

Step 304

At step 304, the communication routing information and the behavior information associated to customer 12 are processed at least in part on the basis of modification information. This processing is done by the conflict monitoring entity 30 in an attempt to determine the suitability of modifying the communication routing information. As will be described in more detail below, the modification information can be stored in the memory unit 36 of the conflict monitoring entity 30 and provides a series of conditions for enabling the processing entity 34 to determine whether the communication routing information associated to customer 12 is suitable for being modified. For example, depending on whether a given condition is met, or not met, the conflict monitoring entity 30 will determine that the communication routing information is suitable for modification.

Figure 4:
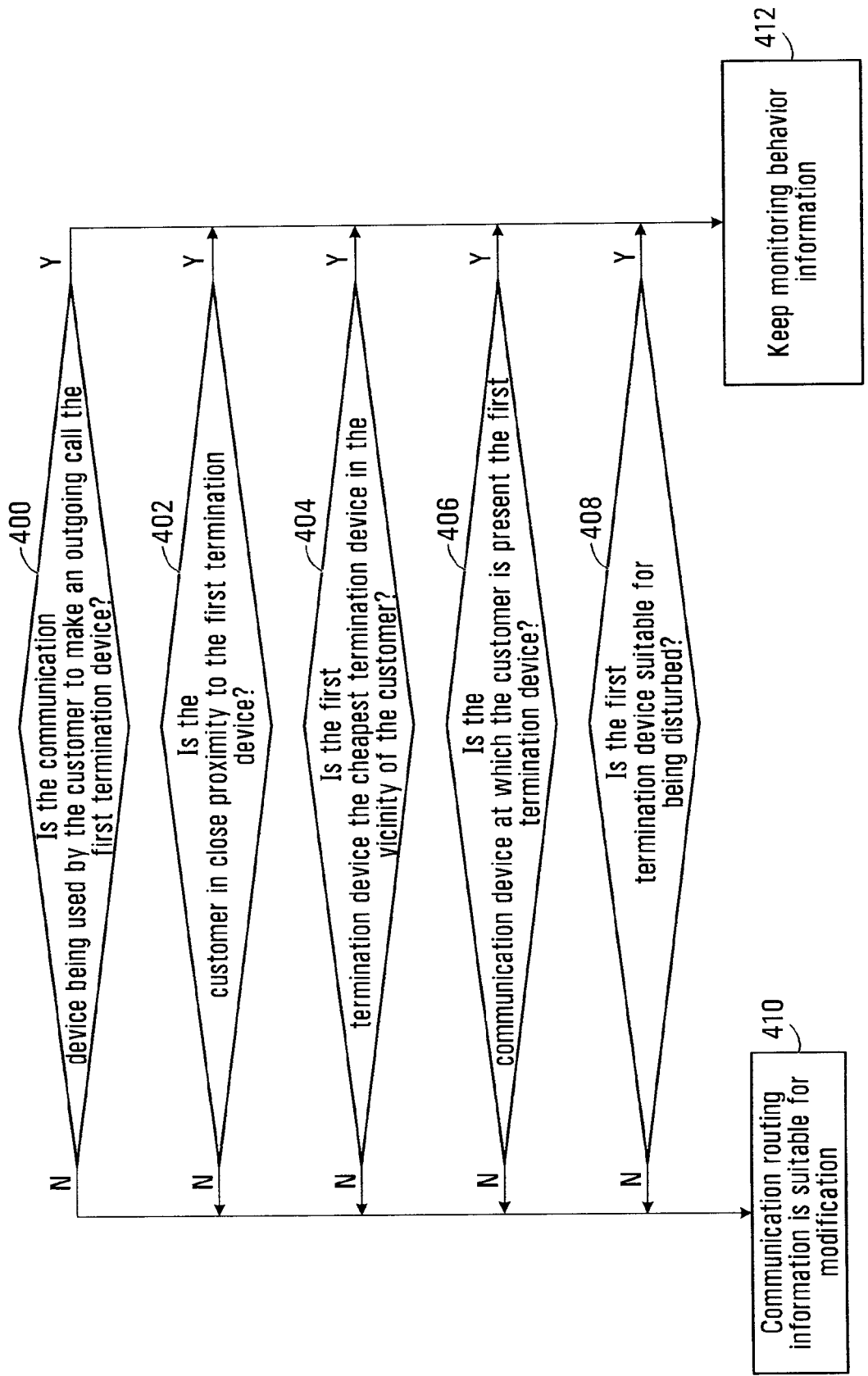
FIG. 4 illustrates an example of potential criteria used by the conflict monitoring entity shown in FIG. 1 to determine the suitability of modification of communication routing information.

Shown in FIG. 4 is a flow diagram showing some non-limiting examples of conditions contained within the modification information for enabling the conflict monitoring entity 30 to determine whether the communication routing information is suitable for modification. As will be used herein, the term first termination device, refers to the first communication device identified in the customer's communication routing information to which incoming calls should be routed. It is possible that the first termination device includes two or more termination devices. As shown, condition 400 is indicative that in situations where the communication device being used by customer 12 to make an outgoing call is not the first termination device, then the communication routing information may be suitable for modification. Condition 402 is indicative that when customer 12 is not in proximity to the first termination device, the communication routing information may be suitable for modification. Condition 404 is indicative that when the first termination device is not the cheapest termination device in the vicinity of customer 12, the communication routing information may be suitable for modification. Condition 406 is indicative that when the communication device at which customer 12 is present is not the first termination device, the communication routing information may be suitable for modification. Finally, Condition 408 is indicative that when customer 12 is not suitable for being disturbed by the first termination device, such as in the case where the first termination device is turned off, the communication routing information may be suitable for modification. As shown in box 412, in the case where these conditions are not met, then the conflict monitoring entity 30 will simply continue to monitor the behavior information.

The manner in which the conflict monitoring entity 30 determines whether the above conditions are satisfied based on the behavior information being monitored by the conflict monitoring entity 30 will be described in more detail further on with respect to specific examples.

It is to be understood that the examples of conditions contained in the modification information shown in FIG. 4 are presented for illustrative purposes only and are not to be considered limiting in any respect.

Although, the above described conditions for determining if the routing information is suitable for modification only consider the first termination device, it should be appreciated that other conditions that are dependent on the second or third termination device specified in the customer's routing information, are also within the scope of the present invention.

Step 306

Figure 3:
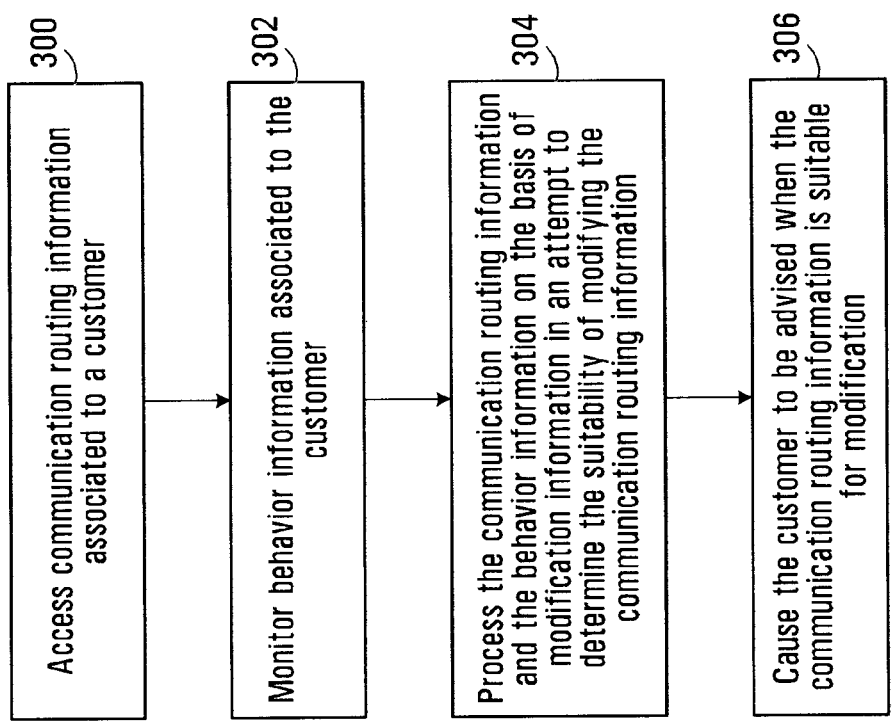
FIG. 3 illustrates an example of operation of the conflict monitoring entity shown in FIG. 1.

Referring back to the flow chart of FIG. 3, once the conflict monitoring entity 30 has determined that the communication routing information is suitable for being modified, it proceeds to step 306 wherein it causes customer 12 to be advised. This may be done in a variety of different ways. For example, the user may be advised via a telephone call from a human operator or from a synthesized voice unit. The telephone call can be destined for one or more of the communication devices $14_1$, $14_2$, $14_3$, $14_4$ associated with customer 12. Alternatively, customer 12 may be advised via an email, a text message, an SMS or via another type of audio or visual cue that is sent to one or more of communication devices $14_1$, $14_2$, $14_3$, $14_4$. For example, the conflict monitoring entity 30 may be operative to send one or more electronic messages such as electronic mail (email) messages, instant messaging (IM) messages (including IM voice messages), or text messages (e.g., Short Messaging Service (SMS) or Multimedia Messaging Service (MMS) messages) to a communication device and/or a computing device associated with customer 12.

In accordance with a non-limiting example of implementation, the conflict monitoring entity 30 advises customer 12 that the communication routing information may be suitable for modification by providing a message such as "please check your communication routing settings", "your communication routing settings should be changed", "a conflict has been detected with your communication routing settings" or "would you like to modify your communication routing settings at this time". Depending on how the customer is advised, i.e. via a telephone call, or a text message, the above notification can be presented to customer 12 either verbally or via written text. In an alternative embodiment, the conflict monitoring entity 30 may simply cause customer 12 to be advised of a potential conflict via a unique ring tone, or other sound, such that when customer 12 hears that sound, she knows that there could be a potential conflict with her routing information.

In order to cause customer 12 to be advised in one of the manners identified above, the conflict monitoring entity 30 interacts with the call processing entity 26, the switching/routing entity 24 and the network portions 21, 22 and 23 associated with the communication devices $14_1$, $14_2$, $14_3$, $14_4$ that are being used in order to advise customer 12 that the communication routing information may be suitable for modification.

Upon receipt of the indication that the communication routing information is suitable for modification, customer 12 may use one or more of her communication devices $14_1$, $14_2$, $14_3$, $14_4$ to interact with the call processing entity 26 and the switching/routing entity 24 in order to re-configure her communication routing information.

In accordance with a further non-limiting example of implementation, once the conflict monitoring entity 30 has determined that the communication routing information is suitable for modification, it may further be operative for determining a suggestion as to how the communication routing information should be modified. The conflict monitoring entity 30 is then operative for providing that suggestion to the customer.

As will be described in more detail below, the conflict monitoring entity 30 is able to determine one or more suggestions for modifying the communication routing information based at least in part on the modification information contained in the memory unit 36. Although not shown in FIG. 4, the modification information may further comprise certain conditions wherein when the behavior information satisfies one or more of the given criteria, a suggestion for modifying the communication routing information is provided. As such, by processing the behavior information on the basis of the modification information, the conflict monitoring entity 30 is able to determine a suggestion as to how to modify the communication routing information.

In the same manner as described above, the suggestion as to how to modify the communication routing information can be provided to customer 12 via a telephone call from a human operator or from a synthesized voice unit. The telephone call can be made to one or more of the communication devices $14_1$, $14_2$, $14_3$, $14_4$ associated with customer 12. Alternatively, customer 12 may be provided with the suggestion via an email, a text message or via an SMS sent to one or more of communication devices $14_1$, $14_2$, $14_3$, $14_4$. The suggestion may be provided to customer 12 via a message such as "would you like to change your routing information to (insert suggestion)", "please change your routing information to (insert suggestion)". Depending on how the customer is advised, i.e. via a telephone call, or a text message, the above messages can be presented to customer 12 either verbally or via written text.

In accordance with an alternative example of implementation (not shown in FIG. 3) in certain circumstances, instead of advising customer that it has been determined that the communication routing information may be suitable for modification and then leaving it up to customer 12 to re-configure the communication routing information, the conflict monitoring entity 30 may instead simply proceed to cause the communication routing information to be modified when it has determined that modification is suitable. This will be described in more detail below with respect to a specific example.

When a customer, such as customer 12, subscribes to the conflict monitoring feature, the process outlined in FIG. 3 can be performed on a continuous, ongoing basis. In such a case, the conflict monitoring entity 30 is continuously, or at regular intervals, accessing the communication routing information associated to customer 12 and monitoring the behavior information associated to customer 12. The conflict monitoring entity 30 is also continuously processing this information on the basis of the modification information in an attempt to determine when the communication routing information is suitable for modification.

However, in an alternative embodiment, the process outlined in FIG. 3 may be performed only when triggered by a certain event. For example, the process may be triggered when an incoming call destined for one or more of communication devices $14_1$, $14_2$, $14_3$, $14_4$ arrives at the switching/routing entity 24. In such a case when the switching/routing entity 24 receives a call destined for one of the communication entities $14_1$, $14_2$, $14_3$, $14_4$ associated to customer 12, the call processing entity 26 will determine, by accessing database 28, that customer 12 subscribes to the "conflict monitoring feature" described herein. Upon detection that customer 12 subscribes to the "conflict monitoring feature", the call processing entity 26 will cause the conflict monitoring entity 30 to initiate the process described above with respect to FIG. 3. As such, each time customer 12 receives an incoming call, the conflict monitoring entity 30 will perform the above described process in an attempt to determine whether customer 12's communication routing information is suitable for modification.

In accordance with another alternative embodiment, the above described process for implementing the conflict monitoring feature will be initiated when customer 12 originates an outgoing call from one or more of communication devices 14₁, 14₂, 14₃, 14₄. It should be appreciated that the conflict monitoring feature may be initiated based on other triggers or events, without departing from the spirit of the invention.

The functioning of the above described conflict monitoring feature will now be described in more detail with respect to specific examples of use. These examples will be described on the assumption that the conflict monitoring entity 30 is performing the method of FIG. 3 on a continuous basis, and not when triggered by a specific event.

Example 1

In order to illustrate a first example in which the conflict monitoring feature may be useful, let us assume that on Monday, customer 12 decides to work from home, at which point she configures her "find me/follow me" feature such that her communication routing information specifies that any incoming calls destined for her work phone (i.e. communication device 14₃) should be forwarded firstly to her home phone (i.e. communication device 14₂) and then, if there is no answer after 3 rings, to her cellular phone (i.e. communication device 14₁). As such, her communication routing information specifies that the first termination device to which incoming calls destined for her work phone (i.e. communication device 14₃) are to be routed, is to her home phone (i.e. communication device 14₂).

Given that the conflict monitoring entity 30 has access to the communication routing information associated to customer 12, the conflict monitoring entity 30 is aware that for incoming calls destined for customer 12's work phone (i.e. communication device 14₃), the first termination device to which calls are to be routed is to customer 12's home phone (i.e. communication device 14₂). The conflict monitoring entity 30 also monitors the behavior information associated to customer 12. This behavior information, as well as the communication routing information, is processed on the basis of the modification information stored in the memory unit 36.

On Monday, while customer 12 is working from home, the conflict monitoring entity 30 does not determine that the communication routing information is suitable for modification, given that the behavior information does not satisfy any of the criteria contained in the modification information. This makes sense since while customer 12 is at home, her communication routing information is configured to work in the manner that she expects.

On Tuesday morning, customer 12 returns to her work office, but forgets to re-configure her communication routing information. As such, all incoming communications to her work phone (i.e. communication device 14₃) are still being routed to her home phone (i.e. communication device 14₂). Given that customer 12 is no longer at home, it is possible that important calls being forwarded to her home phone may be missed. Fortunately, during this time, the conflict monitoring entity 30 is monitoring the behavior information associated to customer 12, and is processing this information, as well as the communication routing information, on the basis of the modification information stored in memory 36. At this point, the behavior information being monitored by the conflict monitoring entity 30 may satisfy one or more of the criteria contained within the modification information, such that the conflict monitoring entity 30 will determine that the communication routing information is suitable for modification.

For example, assuming that when customer 12 arrives at work she originates an outgoing call from her work phone (i.e. communication device 14₃), then the behavior information being monitored by conflict monitoring entity 30 will be indicative that a call has been originated from communication device 14₃. As shown in FIG. 4, condition 400 contained within the modification information indicates that when the communication device being used by the subscriber to make an outgoing call is not the first termination device, then the communication routing information may be suitable for modification (result 410). Given that the conflict monitoring entity 30 is aware that the first termination device specified in the communication routing information is customer 12's home phone, and not the work phone that was just used to originate an outgoing call, based on criteria 400, the conflict monitoring entity 30 will determine that customer 12's communication routing information may be suitable for modification.

In an alternative embodiment, when the behavior information being monitored by conflict monitoring entity 30 is indicative that a call has been originated from communication device 14₃, which is customer 12's work phone, then the conflict monitoring entity 30 may determine that customer 12 is at her work premises. As shown in FIG. 4, condition 402 contained within the modification information indicates that when the subscriber is not in close proximity to the first termination device, then the communication routing information may be suitable for modification (result 410). Given that the conflict monitoring entity 30 is aware that the first termination device specified in the communication routing information is customer 12's home phone, and that the behavior information is indicative that customer 12 is not in proximity to her home phone, the conflict monitoring entity 30 will determine that customer 12's communication routing information may be suitable for modification.

It should be appreciated that the information such as the geographical location of customer 12's home phone (communication entity 14₂) and/or her work phone (communication entity 14₃) can be part of the modification information stored in memory 36. In addition, conditions indicative that customer 12 is no longer in proximity to the first termination device can also be stored in the modification information. For example, condition 402 may be indicative that the subscriber is not in close proximity to the first termination device, if the subscriber is present at her work phone. Such parameters can be built into the conflict monitoring feature, such that they are specified by the service provider, or alternatively, the customer can configure these parameters.

Still keeping with the above scenario wherein customer 12 returns to work on Tuesday and forgets to re-configure her communication routing information, the determination that the communication routing information is suitable for modification could also be done on the basis of behavior information that is indicative of customer 12's presence information. For example, assuming that when customer 12 returns to work on Tuesday, she logs onto her work place computer (i.e. communication device 14₄), then the presence information being monitored by conflict monitoring entity 30 will be indicative that customer 12 is present at communication device 14₄. As shown in FIG. 4, condition 406 contained within the modification information indicates that when the communication device at which the subscriber is present is not the first termination device, then the communication routing information may be suitable for modification. Given that the conflict monitoring entity 30 is aware that the first termination device specified in the communication routing information is customer 12's home phone (i.e. communication device $14_2$), and not the VoIP phone on which the user is present, the processing entity 34 will determine that customer 12's communication routing information may be suitable for modification.

Once the conflict monitoring entity 30 has determined that the communication routing information is suitable for modification, the conflict monitoring entity 30 will then cause customer 12 to be advised. As mentioned above, this may be done by sending a text message, or a voice message to one or more of her communication devices $14_1$, $14_2$, $14_3$, $14_4$. Given that in the scenario given above, customer 12 is no longer at her home phone $14_2$, it would make sense for customer 12 to be advised via one or both of her work phone (communication entity $14_3$) or her cellular phone (communication entity $14_1$). The message may indicate "please change your communication routing information" or "would you like to change your communication routing information", among other possibilities.

Example 2

In this example, let us assume that customer 12 has a meeting outside the office on Monday morning, and as such has configured her "find me/follow me" feature such that her communication routing information specifies that any incoming calls destined for her work phone (i.e. communication device $14_3$) should be forwarded to her cellular phone (i.e. communication device $14_1$). As such, the communication routing information specifies that the first termination device to which incoming calls destined for her work phone (i.e. communication device $14_3$) are to be routed, is to her cell phone (i.e. communication device $14_1$).

Then in the afternoon, customer 12 returns to her office but forgets to re-configure her communication routing information. As such, all incoming communications to her work phone (i.e. communication device $14_3$) are still being routed to her cell phone (i.e. communication device $14_1$). Given that customer 12 presumably still has her cell phone with her, there is minimal risk that incoming calls will be missed. However, assuming that her cell phone (i.e. communication device $14_1$) has the most expensive use plan, and given that customer 12 is now in the vicinity of her work phone (i.e. communication device $14_3$) as well as her work computer which has VoIP capabilities (i.e. communication device $14_4$), it is more than likely that there is a conflict between how customer 12 would like her incoming calls to be routed, and how they are currently being routed. More specifically, customer 12 would probably like her incoming calls for her work phone to go to her work phone, and not be routed to her cell phone, which has the more expensive use plan.

Fortunately, conflict monitoring entity 30 is monitoring the behavior information associated to customer 12, and is processing this information, as well as the communication routing information, on the basis of the modification information stored in memory 36. Given the above scenario, there are a number of conditions contained within the modification information that may be satisfied, thus causing the conflict monitoring entity 30 to determine that the communication routing information is suitable for modification.

For example, when the user returns to her office, she may use her work phone to initiate a call. As such the behavior information associated with customer 12, which is being monitored by the conflict monitoring entity 30, is indicative that customer 12 is in proximity to her work phone, and her VoIP phone. Therefore, when customer 12 uses her work phone, customer 12's behavior information will be indicative that customer 12 is in the vicinity of her work phone $14_3$ and VoIP phone. Assume also that the conflict monitoring entity 30 is aware of the cost structure of each of customer 12's communication devices. As such, the conflict monitoring entity 30 is aware that customer 12's cell phone is the communication device with the most expensive use plan, and that customer 12's work place computer that implements a VoIP phone (communication device $14_4$) has the cheapest use plan.

As shown in FIG. 4, condition 404 contained within the modification information indicates that when the first termination device is not the cheapest communication device in proximity to the subscriber, then the communication routing information may be suitable for modification (result 410). Given that the conflict monitoring entity 30 is aware that the first termination device specified in the communication routing information is customer 12's cell phone (communication device $14_1$), and that the behavior information is indicative that customer 12 is in proximity to her work place computer and her work place phone, which both have cheaper cost structures, the conflict monitoring entity 30 will determine that customer 12's communication routing information may be suitable for modification.

It should be appreciated that information such as the locations of customer 12's work place computer (communication entity $14_4$) and work phone (communication entity $14_3$) can also be part of the modification information stored in memory 36. In addition, information such as the cost structure of the communication devices $14_1$, $14_2$, $14_3$ and $14_4$ can also be part of the modification information. Although the cellular phone has been described above as being the communication device with the most expensive use plan, it should be appreciated that any communication device could have the most expensive cost structure, and that these things can vary depending on a variety of factors such as subscription plan, service provider, etc.

Keeping with the above scenario wherein customer 12 returns to work in the afternoon and forgets to re-configure her communication routing information, instead of determining that the communication routing information is suitable for modification on the basis of her use of her work phone, this determination may instead be made on the basis of behavior information in the form of presence information. For example, assuming that when customer 12 returns to work in the afternoon, she logs onto her work place computer (i.e. communication device $14_4$). At that point, the behavior information being monitored by conflict monitoring entity 30 will be indicative that customer 12 is present at communication device $14_4$. As shown in FIG. 4, condition 406 contained within the modification information indicates that when the communication device at which the subscriber is present is not the first termination device, then the communication routing information may be suitable for modification. Given that the conflict monitoring entity 30 is aware that the first termination device specified in the communication routing information is customer 12's cell phone (i.e. communication device $14_1$), and not the VoIP phone on which the user is present, which has a cheaper cost structure than the cell phone, the conflict monitoring entity 30 will determine that customer 12's communication routing information may be suitable for modification.

Once the conflict monitoring entity 30 has determined that the communication routing information might be suitable for modification, the conflict monitoring entity 30 will cause customer 12 to be advised. As mentioned above, this may be done by sending a text message, or a voice message to one or both of her work phone (communication entity $14_3$) or her cellular phone (communication entity $14_1$). The message may indicate "please change your communication routing information" or "would you like to change your communication routing information", among other possibilities.

Example 3

In this example, let us assume that customer 12 is working at a client site, away from her work office, and as such has configured her "find me/follow me" feature such that her communication routing information specifies that any incoming calls destined for her work phone (i.e. communication device $14_3$), her home phone (i.e. communication device $14_2$) or her VoIP phone (i.e. communication device $14_4$) should be forwarded to her cellular phone (i.e. communication device $14_1$). As such, customer 12's communication routing information specifies that the first termination device to which incoming calls destined for all of her other communication devices are to be routed, is her cell phone (i.e. communication device $14_1$).

At 2 pm, customer 12 has an important meeting scheduled with the client. This scheduled meeting has been entered into her electronic organizer contained on her workplace computer. As such, the behavior information being monitored by the conflict monitoring entity 30, is indicative that customer 12 has a meeting scheduled at that time. Therefore, when conflict monitoring entity 30 processes this information, as well as the communication routing information, on the basis of the modification information stored in memory unit 36, the behavior information will cause the conflict monitoring entity 30 to determine that the communication routing information is suitable for modification. More specifically, as shown in FIG. 4, condition 408 contained within the modification information indicates that when the first termination device is not suitable for being disturbed, then the communication routing information may be suitable for modification (result 410). Given that the conflict monitoring entity 30 is aware that the first termination device specified in the communication routing information is customer 12's cell phone (communication device $14_1$) which is currently being carried by customer 12, and given that customer 12 is about to go into a meeting and probably doesn't want to be disturbed, the conflict monitoring entity 30 will determine that customer 12's communication routing information may be suitable for modification.

It should be appreciated that information such as situations wherein customer 12 shouldn't be disturbed by her cell phone (communication entity $14_1$) can also be part of the modification information stored in memory 36. A list of situations wherein a customer does not wish to be disturbed can be entered into the memory unit 36 by the customer.

Once the conflict monitoring entity 30 has determined that the communication routing information is suitable for modification, the conflict monitoring entity 30 causes customer 12 to be advised. In the circumstance mentioned above, this may be done by sending a text message, or a voice message to customer 12's cell phone (communication entity $14_1$) 5 minutes before her meeting, asking her "would you like to change your communication routing information". In this manner, customer 12 will have the option to configure her communication routing information such that calls are routed to another communication entity, or are routed directly to her voice mail, while she is in her meeting.

Example 4

Modification Based on a Device that can't be Disturbed

In this example, let us assume that customer 12 is running errands around town, and as such has configured her "find me/follow me" feature such that her communication routing information specifies that any incoming calls destined for her work phone (i.e. communication device $14_3$) or her home phone (i.e. communication device $14_2$) should be forwarded to her cellular phone (i.e. communication device $14_1$). In the case where there is no answer on her cell phone after three rings, then these calls should be routed to her home phone (i.e. communication device $14_2$), and if after three rings at her home phone $14_2$ there is still no pick-up, the calls should be forwarded to her voice mail. As such, the communication routing information specifies that the first termination device to which incoming calls destined for either her work phone (i.e. communication device $14_3$) or her home phone (i.e. communication device $14_2$) are to be routed to, is her cell phone (i.e. communication device $14_1$).

In the afternoon, customer 12 visits a friend in the hospital, and thus turns her cell phone off in accordance with hospital policy. As such, all incoming communications to either her work phone (i.e. communication device $14_3$), her cell phone (i.e. communication device $14_1$), and her home phone (i.e. communication device $14_2$) will be sent first to her cell phone (which she won't pick up since the phone is off), then to her home phone, and then to her voice mail. For anyone attempting to reach customer 12, it is a long time to wait before the call is forwarded to voice mail.

Fortunately, conflict monitoring entity 30 is monitoring the behavior information associated to customer 12, and is processing this information, as well as the communication routing information, on the basis of the modification information stored in memory 36. For example, when customer 12 turns off her cell phone (communication device $14_1$), the behavior information associated with her cellular phone, which is being monitored by the conflict monitoring entity 30, is indicative that the cell phone $14_1$ has been turned off. As shown in FIG. 4, condition 408 contained within the modification information indicates that when customer 12 is not suitable for being disturbed by the first termination device, then the communication routing information may be suitable for modification (result 410). Given that the conflict monitoring entity 30 is aware that the first termination device specified in the communication routing information is customer 12's cell phone (communication device $14_1$) which is currently off and thus can't be disturbed, the conflict monitoring entity 30 will determine that customer 12's communication routing information may be suitable for modification (result 410).

As mentioned above, in certain circumstances, instead of advising the customer that the communication routing information is suitable for being modified, the conflict monitoring entity 30 may simply proceed to cause the customer's communication routing information to be modified. For example, in the circumstance indicated above, wherein customer 12 has turned off her cellular phone $14_1$, and is not in the vicinity of any of her other communication devices $14_2$, $14_3$, $14_4$, the conflict monitoring entity 30 is incapable of advising customer 12 that her communication routing information may be suitable for modification. In such a circumstance, the conflict monitoring entity 30 will simply cause the communication routing information to be modified.

In the example outlined above, the conflict monitoring entity 30 may simply modify the communication routing information such that all incoming calls to any one of customer 12's cell phone, home phone or work phone are immediately routed to customer 12's voice mail. Therefore, in this embodiment, all parties may benefit from the conflict monitoring feature contemplated herein without needing to subscribe thereto, since a calling party who calls customer 12's home phone does not have to wait for the call to be routed to a variety of different communication devices before being routed to voice mail.

The circumstances under which the conflict monitoring entity 30 is authorized to simply proceed to modify the customer's communication routing information can be stored in the modification information in memory 36. These circumstances can be predetermined circumstances set by the service provider or circumstances that are configured by the customer.

As described above, in accordance with a non-limiting example of implementation, the conflict monitoring entity 30 is further operative to determine a suggestion as to how to modify the communication routing information, when it has been determined that the configuration information is suitable for modification. This suggestion can be provided to the customer when the customer is advised that the communication routing information is suitable for being modified.

In accordance with a non-limiting example, the conflict monitoring entity 30 is able to determine a suggestion as to how to modify the communication routing information on the basis of criteria contained within the modification information. As such, by processing the communication routing information as well as the behavior information on the basis of the modification information stored in the memory unit 36, the conflict monitoring entity 30 is able to determine a suggestion as to how to modify the communication routing information.

For example, the suggestions could be determined as follows:

1. When the customer originates an outgoing call from a communication device that is not the first termination device, the suggestion will be that the communication routing information is modified such that the communication device on which the customer has originated an outgoing call becomes the first termination device.
2. When the customer is in proximity to an associated communication device that has a cheaper cost structure than the first termination device, the suggestion will be that the communication routing information is modified such that the communication device with the cheaper (or cheapest) cost structure becomes the first termination device.
3. When the customer is not in proximity to the first termination device, the suggestion will be that the communication routing information is modified such that a communication device that is in proximity to the customer becomes the first termination device.
4. When the first termination device cannot or should not be disturbed, the suggestion will be that the communication routing information is modified such that voice mail (or another communication entity) becomes the first termination device.

It is to be understood that these examples of ways in which the conflict monitoring entity 30 can determine a suggestion as to how to modify the communication routing information are presented for illustrative purposes only and are not to be considered limiting in any respect.

In addition to the above examples, the subscriber can configure the conflict monitoring feature such as to identify which communication device they would like to use under a given set of circumstances. In this manner, the subscriber is able to configure the modification information stored in the memory 36 such that for a given set of circumstances, the conflict monitoring entity 30 will determine a suggested modification that has been set by the subscriber. For example, the subscriber can configure the modification information such that whenever the subscriber is in the vicinity of his/her work computer, all calls to the subscriber's cell phone, VoIP phone and work phone, will be routed to his/her work phone. As such, the information contained in the modification information may be as follows:

5. When the customer is in proximity to his/her workplace computer, the suggestion will be that the communication routing information is modified such that the work place computer becomes the first termination device to which calls destined for all of customer 12's communication devices are to be routed; or 6. when customer 12 is in proximity to an associated communication device that is preferred by customer 12 (such as a communication device with speaker phone or cordless hand set), the suggestion will be that the communication routing information is modified such that the preferred communication device becomes the first termination device to which calls destined for all of customer 12's communication devices are to be routed.

In an alternative embodiment, in addition to monitoring behavior information, the conflict monitoring entity 30 may also monitor location information associated to the subscriber. The location information associated to a subscriber would be indicative of the location of customer 12. The conflict monitoring entity 30 can monitor this location information in a variety of ways. For example, assuming that customer 12 generally carries her cellular phone (communication device $14_1$) with her, then the conflict monitoring entity 30 can obtain location information associated to customer 12 based on the location of the cellular phone (communication device $14_1$). This information can be obtained via GPS technology, cellular triangulation, or any other method possible, and can be provided to the conflict monitoring entity 30 via the network portion 21 and the switching/routing entity 24. For example, for customer 12 who subscribes to the conflict monitoring feature, the wireless base station and mobile switching center may be operative to periodically provide the conflict monitoring entity 30 with the cellular triangulation coordinates of communication device $14_1$.

The conflict monitoring device 30 is operative to process the communication routing information and the location information on the basis of the modification information, in the manner described above, in order to determine whether the communication routing information may be suitable for modification.

Monitoring the location information associated with customer 12 is different and much more complex than monitoring the behavior information, as described above throughout the specification. For example, the behavior information described above relies on a user's presence at a given communication device, or the use of one or more of the communication devices by the user, among other things. In contrast, monitoring the location information, as used herein, requires using GPS, cellular triangulation, or another form of location tracking technology.

In accordance with a non-limiting example of implementation, the conflict monitoring entity 30 may be operative to monitor both the behavior information and the location information associated to a customer in order to determine whether the communication routing information is suitable for modification.

Those skilled in the art will appreciate that, in some embodiments, certain functionality of a given component described herein (including the conflict monitoring entity 30) may be implemented as pre-programmed hardware or firmware elements (e.g., application specific integrated circuits (ASICs), electrically erasable programmable read-only memories (EEPROMs), etc.) or other related elements. In other embodiments, a given component described herein (including the conflict monitoring entity 30) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

While specific embodiments of the present invention have been described and illustrated, it will be apparent to those skilled in the art that further modifications and variations can be made without departing from the scope of the invention as defined in the appended claims.

The invention claimed is:

1. A method implemented by a network entity, said method comprising:
receiving, from a party, a request for conflict monitoring and suggestion for modification in terms of communication routing information pre-configured by the party;
in response to the request for conflict monitoring and suggestion for modification, monitoring behavior information associated to the party and the communication routing information pre-configured by the party, the pre-configured communication routing information being indicative of an incoming communication addressed to a communication device of the party being routed to at least one termination device as an alternative destination device under one or more rules pre-configured by the party, the one or more rules preconfigured by the party comprising a condition indicative of the party's unavailability to engage in communication exchanges via the communication device, the communication routing information being configurable by the party;
in response to the request for conflict monitoring and suggestion for modification, processing the pre-configured communication routing information and the behavior information at least in part on the basis of modification information in an attempt to determine if said pre-configured communication routing information stored in a memory is suitable for modification by the party; and
causing the party to be advised when said processing has determined that the pre-configured communication routing information stored in the memory is suitable for modification by the party to reconfigure at least a part of the one or more rules preconfigured by the party in the communication routing information so that a future incoming call to the party is routed to the party's devices other than the at least one termination device based on the modified one or more rules without notification to a sender of the future incoming call.

2. A method as defined in claim 1, wherein the at least one termination device includes at least one first termination device to which incoming communications are to be routed.

3. A method as defined in claim 2, wherein the behavior information is indicative of one of communication devices from which the party has made an outgoing call, the modification information being indicative that the communication routing information is suitable for modification when the communication device from which the party has made an outgoing call is not the at least one first termination device specified in the communication routing information.

4. A method as defined in claim 2, wherein the behavior information is indicative that the party has logged on to one of communication devices, the modification information being indicative that the communication routing information is suitable for modification when the communication device is not the at least one first termination device specified in the communication routing information.

5. A method as defined in claim 2, wherein the behavior information is indicative that the party has logged on to one of communication devices, the modification information being indicative that the communication routing information is suitable for modification when said party has logged on to a second communication device is not the at least one first termination device specified in the communication routing information.

6. A method as defined in claim 2, wherein the behavior information is indicative that one of communication devices associated with the party shouldn't be disturbed, the modification information being indicative that the communication routing information is suitable for modification when the communication device that shouldn't be disturbed is the at least one first termination device specified in said communication routing information.

7. A method as defined in claim 2, further comprising:
determining the suggestion as to how to modify said communication routing information; and
providing said suggestion to the party.

8. A method as defined in claim 7, wherein when the party originates an outgoing call from one of communication devices that is not the at least one first termination device, the suggestion being to modify the communication routing information such that the communication device on which the customer has originated an outgoing call becomes the at least one first termination device specified in the communication routing information.

9. A method as defined in claim 7, wherein when the party is in proximity to one of communication devices that has a cheaper cost structure than the at least one first termination device, the suggestion being to modify the communication routing information such that the communication device with the cheaper cost structure becomes the at least one first termination device specified in the communication routing information.

10. A method as defined in claim 7, wherein when the party is not in proximity to the at least one first termination device, the suggestion being to modify the communication routing information such that one of communication devices that is in proximity to the customer becomes the at least one first termination device specified in the communication routing information.

11. A method as defined in claim 7, wherein under a given set of circumstances the suggestion being to modify the communication routing information such that an incoming communication for the party is routed to an alternative termination device that has been identified as being a more desirable termination device under the given set of circumstance.

12. A method as defined in claim 7, wherein when a user of the at least one first termination device should not be disturbed, the suggestion being to modify the communication routing information such that an incoming call for the party is routed to voice mail.

13. A method as defined in claim 7, further comprising:
requesting authorization from the party to modify the communication routing information in accordance with said suggestion provided to the party; and
modifying the communication routing information in accordance with said suggestion provided to the party upon authorization received from the party.

14. A method as defined in claim 1, wherein the party is advised via an instant text message when said processing has determined that the communication routing information is suitable for modification.

15. A method as defined in claim 1, wherein the party is advised via IVR, when said processing has determined that the communication routing information is suitable for modification.

16. A method as defined in claim 1, wherein the party is advised via email when said processing has determined that the communication routing information is suitable for modification.

17. A softswitch configured to implement the method defined in claim 1.

18. A method as defined in claim 1, further comprising:
determining the suggestion as to how to modify said communication routing information;
providing said suggestion to the party;
requesting authorization from the party to modify the communication routing information in accordance with said suggestion provided to the party; and
modifying the communication routing information in accordance with said suggestion provided to the party upon authorization received from the party.

19. A non-transitory computer-readable storage medium comprising instructions which, when executed by a network entity, cause the network entity to carry out a method that comprises:
receiving, from a party, a request for conflict monitoring and suggestion for modification in terms of communication routing information pre-configured by the party;
in response to the request for conflict monitoring and suggestion for modification, monitoring behavior information associated to the party and the communication routing information pre-configured by the party, the pre-configured communication routing information being indicative of an incoming communication addressed to a communication device of the party being routed to at least one termination device as an alternative destination device under one or more rules preconfigured by the party, the one or more rules preconfigured by the party comprising a condition indicative of the party's unavailability to engage in communication exchanges via the communication device, the communication routing information being configurable by the party;
in response to the request for conflict monitoring and suggestion for modification, processing the pre-configured communication routing information and the behavior information at least in part on the basis of modification information in an attempt to determine if said pre-configured communication routing information stored in a memory is suitable for modification by the party; and
causing the party to be advised when said processing has determined that the pre-configured communication routing information stored in the memory is suitable for modification by the party to reconfigure at least a part of the one or more rules preconfigured by the party in the communication routing information so that a future incoming call to the party is routed to the party's devices other than the at least one termination device based on the modified one or more rules without notification to a sender of the future incoming call.

20. A non-transitory computer-readable storage medium as defined in claim 19, wherein the at least one termination device to which incoming communications for the party are to be routed, includes at least one first termination device to which incoming communications are to be routed.

21. A non-transitory computer-readable storage medium as defined in claim 20, wherein the behavior information is indicative of one of communication devices from which the party has made an outgoing call, the modification information being indicative that the communication routing information is suitable for modification when the communication device from which the party has made an outgoing call is not the at least one first termination device specified in the communication routing information.

22. A non-transitory computer-readable storage medium as defined in claim 20, wherein the behavior information is indicative that the party has logged on to one of communication devices, the modification information being indicative that the communication routing information is suitable for modification when the communication device is not the at least one first termination device specified in the communication routing information.

23. A non-transitory computer-readable storage medium as defined in claim 20, wherein the behavior information is indicative that the party has logged on to one of communication devices, the modification information being indicative that the communication routing information is suitable for modification when a communication device in proximity to a location where said party has logged on to the communication device is not the at least one first termination device specified in the communication routing information.

24. A non-transitory computer-readable storage medium as defined in claim 20, wherein the behavior information is indicative that one of communication devices associated with the party shouldn't be disturbed, the modification information being indicative that the communication routing information is suitable for modification when the communication device that shouldn't be disturbed is the at least one first termination device specified in said communication routing information.

25. A non-transitory computer-readable storage medium as defined in claim 20, wherein the method further comprises:
determining the suggestion as to how to modify said communication routing information; and
providing said suggestion to the party.

26. A non-transitory computer-readable storage medium as defined in claim 25, wherein when the party originates an outgoing call from one of communication devices that is not the at least one first termination device, the suggestion being to modify the communication routing information such that the communication device on which the customer has originated an outgoing call becomes the at least one first termination device specified in the communication routing information.

27. A non-transitory computer-readable storage medium as defined in claim 25, wherein when the party is in proximity to one of communication devices that has a cheaper cost structure than the at least one first termination device, the suggestion being to modify the communication routing information such that the communication device with the cheaper cost structure becomes the at least one first termination device specified in the communication routing information.

28. A non-transitory computer-readable storage medium as defined in claim 25, wherein when the party is not in proximity to the at least one first termination device, the suggestion being to modify the communication routing information such that one of communication devices that is in proximity to the customer becomes the at least one first termination device specified in the communication routing information.

29. A non-transitory computer-readable storage medium as defined in claim 25, wherein under a given set of circumstances the suggestion being to modify the communication routing information such that an incoming communication for the party is routed to an alternative termination device that has been identified as being a more desirable termination device under the given set of circumstance.

30. A non-transitory computer-readable storage medium as defined in claim 25, wherein when a user of the at least one first termination device should not be disturbed, the suggestion being to modify the communication routing information such that an incoming call for the user is routed to voice mail.

31. A non-transitory computer-readable storage medium as defined in claim 25, wherein the method further comprises:
requesting authorization from the party to modify the communication routing information in accordance with said suggestion provided to the party; and
modifying the communication routing information in accordance with said suggestion provided to the party upon authorization received from the party.

32. A non-transitory computer-readable storage medium as defined in claim 20, wherein the party is advised via an instant text message when said processing has determined that the communication routing information is suitable for modification.

33. A non-transitory computer-readable storage medium as defined in claim 20, wherein the party is advised via IVR when said processing has determined that the communication routing information is suitable for modification.

34. A non-transitory computer-readable storage medium as defined in claim 20, wherein the party is advised via email when said processing has determined that the communication routing information is suitable for modification.

35. A non-transitory computer-readable storage medium comprising a program element for execution by a processing unit to implement a modification entity, said program element comprising:
program code for receiving, from a party, a request for conflict monitoring and suggestion for modification in terms of communication routing information pre-configured by the party;
program code for in response to the request for conflict monitoring and suggestion for modification, monitoring behavior information associated to the party and the communication routing information pre-configured by the party, the pre-configured communication routing information being indicative of an incoming communication addressed to a communication device of the party being routed to at least one termination device as an alternative destination device under one or more rules preconfigured by the party, the one or more rules preconfigured by the party comprising a condition indicative of the party's unavailability to engage in communication exchanges via the communication device, the communication routing information being configurable by the party;
program code for in response to the request for conflict monitoring and suggestion for modification, processing the pre-configured communication routing information and the behavior information at least in part on the basis of modification information in an attempt to determine the suitability of modifying, by the party, said pre-configured communication routing information stored in a memory; and
program code for causing the party to be advised when said processing has determined that the pre-configured communication routing information stored in the memory is suitable for modification by the party to reconfigure at least a part of the one or more rules preconfigured by the party in the communication routing information so that a future incoming call to the party is routed to the party's devices other than the at least one termination device based on the modified one or more rules without notification to a sender of the future incoming call.

36. A method as defined in claim 35, further comprising:
determining the suggestion as to how to modify said communication routing information;
providing said suggestion to the party;
requesting authorization from the party to modify the communication routing information in accordance with said suggestion provided to the party; and
modifying the communication routing information in accordance with said suggestion provided to the party upon authorization received from the party.

37. A method implemented by a network entity, said method comprising:
receiving, from a party, a request for conflict monitoring and suggestion for modification in terms of communication routing information pre-configured by the party;
in response to the request for conflict monitoring and suggestion for modification, monitoring location information associated to the party and the communication routing information pre-configured by the party, the pre-configured communication routing information being indicative of an incoming communication addressed to a communication device of the party being routed to at least one termination device as an alternative destination device under one or more rules pre-configured by the party, the one or more rules preconfigured by the party comprising a condition indicative of the party's unavailability to engage in communication exchanges via the communication device, the communication routing information being configurable by the party;

in response to the request for conflict monitoring and suggestion for modification, processing the pre-configured communication routing information and the location information at least in part on the basis of modification information in an attempt to determine if said pre-configured communication routing information stored in a memory is suitable for modification by the party; and causing the party to be advised when said processing has determined that the pre-configured communication routing information stored in the memory is suitable for modification by the party to reconfigure at least a part of the one or more rules preconfigured by the party in the communication routing information so that a future incoming call to the party is routed to the party's devices other than the at least one termination device based on the modified one or more rules without notification to a sender of the future incoming call.

38. A method as defined in claim 37, wherein the at least one termination device to which incoming communications for the party are to be routed, includes at least one first termination device to which the incoming communications are to be routed.

39. A method as defined in claim 38, wherein the location information is indicative of a geographical position of the party, the modification information being indicative that the communication routing information is suitable for being modified when the geographical position of the party is not in proximity to the at least one first termination device specified in said communication routing information.

40. A method as defined in claim 38, wherein the location information is indicative of a geographical position of the party, the modification information being indicative that the communication routing information is suitable for modification when the party is in proximity to one of communication devices having a cheaper cost structure than the at least one first termination device specified in said communication routing information.

41. A method as defined in claim 38, wherein monitoring the location information associated to the party is performed by monitoring one of GPS coordinates and cellular triangulation coordinates.

42. A non-transitory computer-readable storage medium comprising instructions which, when executed by a network entity, cause the network entity to carry out a method that comprises:

receiving, from a party, a request for conflict monitoring and suggestion for modification in terms of communication routing information pre-configured by the party;

in response to the request for conflict monitoring and suggestion for modification, monitoring location information associated to the party and the communication routing information pre-configured by the party, the pre-configured communication routing information being indicative of an incoming communication addressed to a communication device of the party being routed to at least one termination device as an alternative destination device under one or more rules pre-configured by the party, the one or more rules preconfigured by the party comprising a condition indicative of the party's unavailability to engage in communication exchanges via the communication device, the communication routing information being configurable by the party;

in response to the request for conflict monitoring and suggestion for modification, processing the pre-configured communication routing information and the location information at least in part on the basis of modification information in an attempt to determine if said pre-configured communication routing information stored in a memory is suitable for modification by the party; and causing the party to be advised when said processing has determined that the pre-configured communication routing information stored in the memory is suitable for modification by the party to reconfigure at least a part of the one or more rules preconfigured by the party in the communication routing information so that a future incoming call to the party is routed to the party's devices other than the at least one termination device based on the modified one or more rules without notification to a sender of the future incoming call.

43. A non-transitory computer-readable storage medium as defined in claim 42, wherein the method further comprises:

determining the suggestion as to how to modify said communication routing information;

providing said suggestion to the party;

requesting authorization from the party to modify the communication routing information in accordance with said suggestion provided to the party; and modifying the communication routing information in accordance with said suggestion provided to the party upon authorization received from the part.

* * * * *